Nov. 7, 1933.  S. SCHNETZER  1,933,938
APPARATUS FOR WELDING
Filed March 24, 1933  2 Sheets-Sheet 1
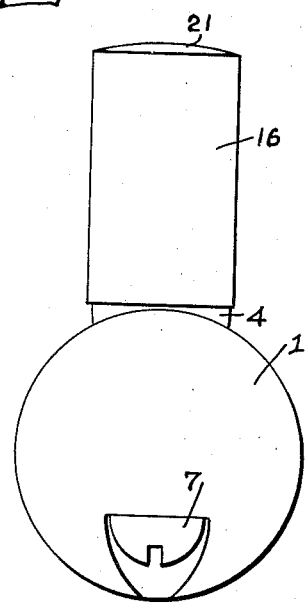
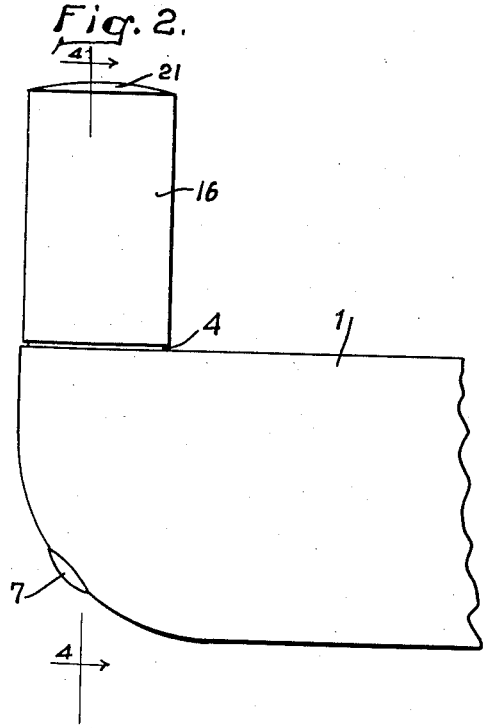
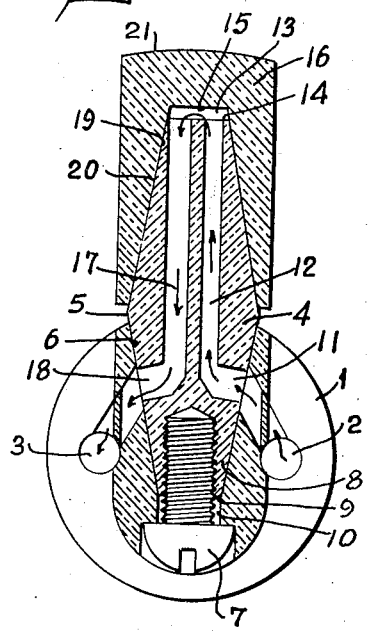
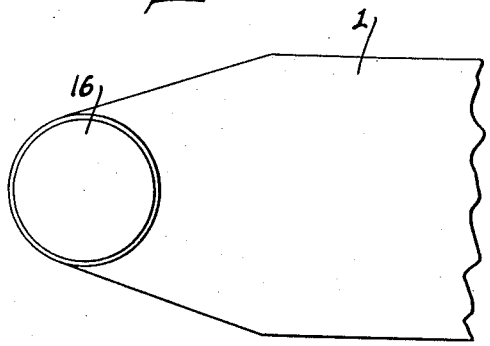
Inventor
SIEGFRIED SCHNETZER,
By
Attorneys

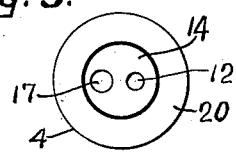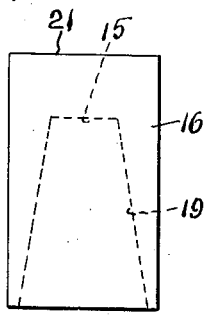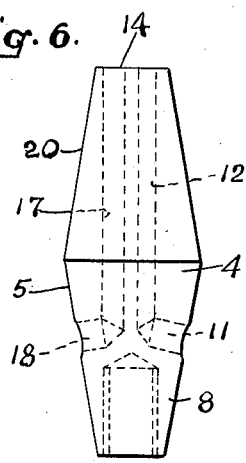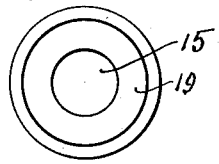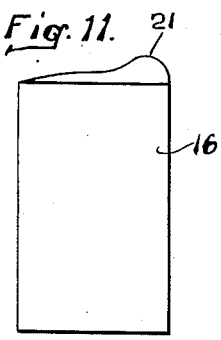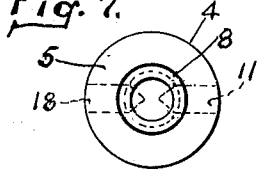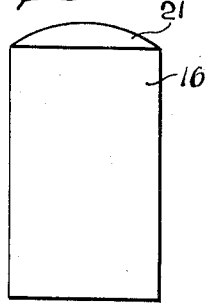

Patented Nov. 7, 1933

1,933,938

UNITED STATES PATENT OFFICE 1,933,938

APPARATUS FOR WELDING

Siegfried Schnetzer, Sparrows Point, Md., assignor to General Aviation Manufacturing Corporation, Dundalk, Md., a corporation of Delaware Application March 24, 1933. Serial No. 662,568

3 Claims. (Cl. 219—4)

My invention relates to welding apparatus and methods of welding, and, in particular, to that type of welding called spot welding.

One object of my invention is to provide an improved spot welding electrode tip and support therefor, having provision for accurately controlling the temperature thereof.

Another object is to provide a fluid-controlled, detachable electrode tip.

Another object is to provide a fluid-controlled electrode tip wherein the controlling fluid comes directly into contact with the electrode tip, whereby the minimum time lag occurs between a change of temperature on one side of the tip wall and a corresponding re-adjustment of temperature on the other side of that wall.

A further object is to provide a detachable electrode and a support therefor which are strong and rigid, and which may be maintained at any desired temperature by a temperature-controlling agency passing therethrough.

A further object is to provide a detachable electrode tip which can be rotated about its axis so as to present any portion of said tip in any desired position relative to the electrode tip support.

A further object is to provide a method of accurately regulating the temperature during the various steps of a welding operation according to a predetermined plan.

A further object is to provide a method of accurately controlling the temperatures during the successive stages of a series of welding operations, varying the temperatures according to a predetermined plan.

Other objects and purposes will appear more fully from the following description taken in connection with the accompanying drawings and appended claims.

In the drawings:

Figure 1 is an end elevation of the welding apparatus, showing an end view of the electrode arm, the electrode tip support, and the electrode tip itself.

Figure 2 is a side elevation of the welding apparatus shown in Figure 1.

Figure 3 is a plan view of the welding apparatus shown in Figures 1 and 2.

Figure 4 is a cross-sectional view taken along the line 4—4 of Figure 2.

Figure 5 is a top plan view of the electrode tip support.

Figure 6 is a side elevation of the electrode tip support.

Figure 7 is a bottom plan view of the electrode tip support shown in Figures 5 and 6.

Figure 8 is a side elevation of the electrode tip.

Figure 9 is a bottom plan view of the electrode tip shown in Figure 8.

Figure 10 is a side elevation of a modified form of electrode tip.

Figure 11 is a side elevation of another modified form of electrode tip.

In general my invention comprises an electrode arm, an electrode tip support on one end of this arm provided with conduits for the passage of a temperature-controlling fluid, and a detachable electrode tip removably attached to the electrode tip support and forming therewith a chamber for the reception of the temperature-controlling fluid.

Referring to the drawings in detail, 1 is an electrode arm which forms a general support for the apparatus hereinafter described, and contains an intake conduit 2 and an outlet conduit 3 the passage of a temperature-regulating fluid. At one end of the electrode arm 1 is secured an electrode tip support 4, having a tapered portion 5 fitting into a corresponding tapered socket 6 in the electrode arm 1, and secured therein by a threaded screw 7 operating in a threaded portion 8 in the lower end of the electrode tip support 4, the taper thereof being cut off at 9 to provide a take-up space 10.

The electrode tip support 4 contains a bore 11 opening from the intake conduit 2 to a continuation 12 of the intake conduit 2 within the electrode tip support. The intake continuation 12 opens into a chamber 13 formed between the top 14 of the electrode tip support and the inner end wall 15 of the electrode tip 16. From the chamber 13 opens a continuation 17 of the outlet conduit 3, the two conduits being connected by the bore 18.

The electrode tip 16 is roughly cylindrical in form, having a hollow internal taper 19 engaging the corresponding external taper 20 of the electrode tip support 4. The corresponding tapers 19 and 20 are angled to an inclination which will give adequate holding power and yet enable the tip to be quickly and easily detached without the necessity of using special tools. In practice it is found that a taper angle of about 10 degrees suffices to grip the tips adequately during welding operations and yet facilitates the frequent replacements necessary during a series of welding operations. Furthermore, by this tapered construction, the electrode tip 16 may be rotated around its axis in order to bring various portions of the electrode into convenient relationship with the work, especially when an asymmetrical tip is employed as in Figure 11. By this construction, my detachable electrode tip is comparatively inexpensive to manufacture, hence its use reduces the cost of welding operations since the life of an electrode tip is comparatively short. The screw tips and others heretofore employed are more expensive to manufacture, and their replacement consumes a larger amount of time during the welding operations than is necessary with my improved tip.

The top surface 21 of the electrode tip 16 may be flat, or it may be curved in various ways to suit the nature of the particular work being welded: it may have a flat top as in Figure 8, or a regular curvature as in Figures 1 and 10, or an asymmetrical surface, such as the decentered protuberance shown in Figure 11. In practice the curvature of a convex tip is found to be preferably more than one inch in radius.

The end wall of the electrode tip 16 lying between the inner face 15 and the outer face 21 is thus in direct contact with the temperature-controlling fluid, with no intervening air spaces or joints to retard the free flow of heat: consequently the temperature of the tip surface 21 readily responds to the action of the controlling fluid in the chamber 13. The outlet conduit 17 of the tip support is made larger than the inlet conduit 12 in order that there will be no piling up of the temperature-controlling fluid in the chamber 13, the relative sizes being so proportioned as to give satisfactory temperature control, and yet allow a suitable construction to enable the firm holding of the electrode tip. The triple problem of adequate control of the electrode temperature, ease of replacement, and sufficient metal area and consequent structural strength is thus solved by my construction.

As shown in Figures 1 to 4 inclusive, the electrode tip 16 and the electrode tip support 4 are mounted in an offset position on the electrode arm 1, but it is to be understood that these members 4 and 16 may be mounted in a position which is a direct continuation of the electrode arm 1, without departing from the spirit of my invention. It is also to be understood that the curvature or configuration of the top end 21 of the electrode tip may be varied to adapt the tip to different kinds of work and yet remain within the scope of my invention. The asymmetrical tip shown in Figure 11, for example, is highly convenient in welding certain kinds of work since it may be rotated during a fabricating operation to meet difficult accessibility conditions with a minimum of effort and at no sacrifice in either thermal or electrical conducting properties.

In operation the electrode arm 1 may be mounted in spot welding apparatus of any desired form, such as is well known in the welding art. A flow of temperature-controlling fluid, preferably water, is then established. The fluid traverses the electrode arm 1 through the conduit 2, thence passes by way of the bore 11 through the continuation conduit 12 into the chamber 13 where it brings the electrode tip into the same temperature relationship. The fluid then flows out of the chamber 13 into the larger conduit 17, thence through the outlet bore 18 into the outlet conduit 3 in the electrode arm 1. The temperature-controlling fluid is regulated in any suitable manner by external means (not shown).

The electrode tip is then brought into contact with the work, which is usually placed upon a reaction member or anvil, and pressure is applied between the electrode tip and the anvil while a flow of electrical energy is established therebetween: the electrical resistance rises, heat develops in the work, and welding takes place. The flow of electrical energy is then cut off and the electrode tip 16 removed from contact with the work.

The flow of electrical energy may be interrupted automatically when the pressure is removed, or at any desired time during the welding operation.

My improved method of welding may be carried out by the aid of the above described apparatus or by other suitable apparatus. For a single welding operation, my method comprises bringing the electrode tip and the work with which it is in contact to a certain predetermined temperature by means of the temperature controlling fluid, imparting a flow of electrical energy through the work with a consequent production of heat, allowing the temperature of the tip and the work in contact therewith to rise to a predetermined temperature level, cutting off the flow of electrical energy, and reducing the temperature of the electrode tip and the work in contact with it to a predetermined level by continuing the flow of the temperature-controlling fluid after the electrical energy flow has ceased: the application of mechanical pressure also preferably accompanies the application of the electrode tip to the work, and facilitates the progress of the welding operation. For example, at the start of the welding operation, the electrode temperature may be brought to a level of slightly below room temperature, say 60 degrees, allowed to rise during welding to about 100 degrees, and thereafter reduced again to approximately 60 degrees. It is to be emphasized that the temperature-controlling function of the fluid is not merely to cool the electrode tip and thus lengthen its life or prevent sticking, but in contrast is to maintain accurate and predetermined temperatures throughout the entire operation.

In carrying out a series of welding operations, my method is as above described, with the further provision that after the first welding operation the electrode tip is maintained in contact with the work until the temperature falls to the same level as the starting temperature: thereupon the work is transferred to the next welding location, the temperature started at the same temperature as in the first welding operation, the temperature allowed to rise to the same level during welding, and again reduced to the starting temperature before starting another weld. In this way each welding operation is started and finished with the same tip temperature, and reaches the same peak maximum during the operation. The difference between the starting and peak temperatures may be kept within any desired limits by suitable manipulation of the temperature-controlling means. Furthermore, by thus providing a relatively thin end wall on the electrode, the temperature difference between the outer face 21 and inner wall 15 of the electrode 16 is kept at a minimum. In this way the temperature of the work is not allowed to rise during a series of welding operations, as is frequently the case in ordinary methods of welding.

The area of the work actually welded in a given welding operation is only a small proportion of the electrode tip, the latter sometimes being 88 per cent. greater in area than the fused area of a spot weld.

By my method the temperature of the electrode tip is kept from reaching such temperatures at which melting and alloying of the tip with the work might arise—in other words, a comparatively cold electrode tip is maintained. A uniform behavior of temperature over an indefinite number of welds is likewise maintained. For example, in a series of sixty welding operations, each welding operation might start with a tip temperature of 60 degrees, reach a maximum of 100 degrees during welding, and be reduced to the same temperature of 60 degrees upon completion of each operation cycle, whereupon the next welding operation cycle would likewise start with a tip temperature of 60 degrees, and so on through the series. The behavior of the tip temperature is, therefore, the same during the sixtieth weld as it was during the third weld.

It will be understood that I desire to comprehend within my invention such modifications as may be necessary to adapt it to varying conditions and uses.

Having thus fully described my invention, what I claim as new and desire to secure by Letters Patent is:

1. In combination, a tip support having a tapered base, a correspondingly tapered carrier engaging the taper of said tip support, said tip support having lateral intake and outlet ports and longitudinally connected passageways opening through the end of the support, a detachable cap tip mounted on the end of said support, the interior of which forms with the end of the support a liquid cooling chamber, an electrode arm having a tapered socket, said tip support having a second oppositely tapered portion adapted to fit in said tapered socket and means for fixedly attaching said tip support to said electrode arm.

2. In combination, a tip support having a tapered base, a correspondingly tapered carrier engaging the taper of said tip support, said tip support having lateral intake and outlet ports and longitudinally connected passageways opening through the end of the support, a detachable cap tip mounted on the end of said support, the interior of which forms with the end of the support a liquid cooling chamber, the head of said tip support being tapered upwardly and outwardly toward its outer end and the interior of the cap being tapered downwardly and outwardly from its inner to its outer end, an electrode arm having a tapered socket, said tip support having a second oppositely tapered portion adapted to fit in said tapered socket and means for fixedly attaching said tip support to said electrode arm.

3. In combination a tip support having a tapered base a correspondingly tapered carrier engaging the tapered taper of said tip support, said tip support having passageways opening through the end of said support, a detachable cap tip mounted on the end of said support, the interior of which forms with the end of the support, a liquid cooling chamber, the head of said tip support being tapered inwardly in opposite directions from its middle portion, a base having a tapered socket, adapted to receive one end of said tapered support, the other end of said tapered support being adapted to receive the interiorly tapered portion of a cap, and means bearing against the opposite side of said base from said tapered portion for securing said tip support thereto.

SIEGFRIED SCHNETZER.